June 4, 1940.  T. ZUSCHLAG  2,202,885
APPARATUS FOR GEOPHYSICAL EXPLORATION
Filed Oct. 21, 1937
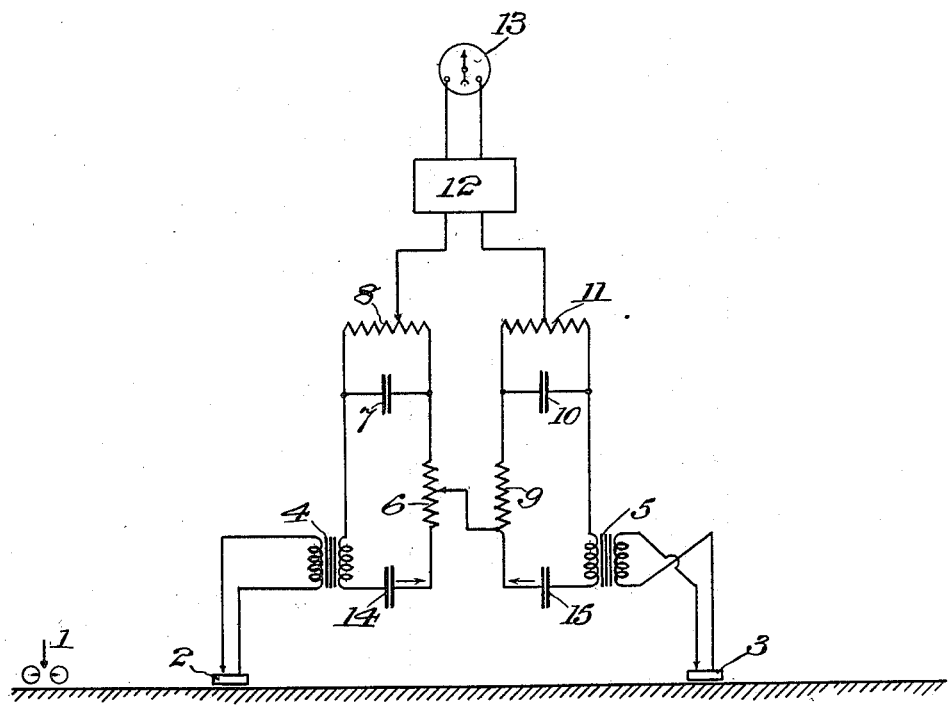
INVENTOR
Theodor Zuschlag
BY
his ATTORNEYS Patented June 4, 1940

2,202,885

UNITED STATES PATENT OFFICE 2,202,885

APPARATUS FOR GEOPHYSICAL EXPLORATION

Theodor Zuschlag, West Englewood, N. J., assignor to Hans T. F. Lundberg, Montreal, Quebec, Canada Application October 21, 1937, Serial No. 170,227

8 Claims. (Cl. 181—0.5)

This invention relates to apparatus for geophysical exploration, and has for an object to provide for a systematic investigation of the distribution of vibratory waves artificially created in the surface and sub-surface of the ground.

Another object is to provide such an apparatus which is relatively simple in construction and easily handled, while being accurate and efficient in operation.

Another object is to provide an apparatus that produces informative and accurate results with a small number of steps or operations that are susceptible of ready accomplishment by one skilled in this art.

A further object consists in providing certain improvements in the form, construction and arrangement of the parts, and in the steps followed, whereby the above named and other objects may effectively be obtained.

In the art of geophysical exploration that is followed mainly for predetermining the location and character of substances lying beneath the surface of the ground, it is a well-known fact that the distribution of waves, artificially created in the ground by a suitable mechanical oscillator, is affected by variations in the speed of propagation or travel of such waves within or through the different media in the ground through which they pass. This speed of propagation of the waves depends upon the coefficient of elasticity of the various ground media, and thus it may serve as a criterion enabling the detection of the presence of media of varying elasticity, which detection is accomplished by noting the deviations the speed of propagation causes within a mechanical wave pattern or outline created by a source of artificial vibrations.

Previously it has been customary to investigate such wave patterns by means of oscillographic records together with appropriate sounding devices. In devising the present invention, it has been my endeavor to simplify the apparatus used to obtain the desired results and, to that end, I have developed simple compensating and indicating apparatus that enables the investigation of such vibratory wave patterns in a manner analogous to that followed in the art of electrical prospecting.

According to my invention, the desired information as to the character of the ground media is obtained by investigating the phase and amplitude relationship of the mechanical waves created by a source of vibratory energy; which investigation calls for the presence of a compensator of such design as to make possible a complete compensation of low frequency wave oscillations with a minimum of auxiliary apparatus.

A practical embodiment of apparatus according to my invention is shown in the accompanying drawing in which the reference numeral 1 denotes a suitable mechanical oscillator, preferably of the opposed eccentric or vibrating membrane type driven from an appropriate source of energy. The vibratory waves generated by the oscillator 1 travel through the ground and are collected by a pair of electrically similar pickups of the microphone, crystal, condenser, or electro-magnetic coil type, which pickups are marked 2 and 3, and are preferably located on a substantially straight line projecting from oscillator 1.

The outputs of pickups 2, 3 are connected to the primaries of two similar matching transformers 4, 5. The secondary of transformer 4 is connected in series with a potentiometer 6 and a phase condenser 7 which latter is shunted by a second potentiometer 8; while the secondary of transformer 5 is connected in series with a fixed resistor 9 and a phase condenser 10 which latter is shunted by a center tapped resistor 11.

The two condensers 7 and 10 are constructed to have similar electrical values, and the same is true with respect to the electric resistances of potentiometer 6 and resistor 9, as also with respect to potentiometer 8 and resistor 11.

The slider of potentiometer 8 and the center of the fixed resistor 11 are connected to the input of an amplifying device 12, the output of which latter is arranged to be measured by means of an indicating meter 13 connected therewith. The electrical circuit of the apparatus is completed by connecting the slider of potentiometer 6 to the end of resistor 9, which latter, as previously stated, is connected to the secondary of transformer 5.

In the operation of this apparatus constituting part of my invention, the oscillator 1 and pickups 2, 3 are placed upon the ground to be explored in substantially the relationship shown and described, and the oscillator is set in motion. The mechanical waves generated by the oscillator and collected by pickups 2 and 3 are changed into electrical oscillations of the same frequency, which latter create corresponding electrical current flows in the secondary circuits 4, 6, 7 and 5, 9, 10. If it be assumed that the said currents flow in the direction of the arrows leading from transformers 4 and 5, and if it be further assumed that the phase of the said two currents is the same, then it is evident that, by shifting the slider of potentiometer 6, the resulting current flow in the circuit 12, 8, 6, 9, 11 may be brought to zero, provided the slider of potentiometer 8 is positioned at the center thereof. The zero condition can be recognized and established by noting the deflection of the needle on indicating meter 13.

If now, R be regarded as representing the value of resistor 9, and X be regarded as representing the value of the resistance between the slider of potentiometer 6 and the end of said potentiometer which is nearer to condenser 7, then the ratio $$\frac{X}{R}$$

is proportionate to the ratio of the amplitude of the mechanical waves collected at pickups 2 and 3.

In actual practice it will be found that the above-named assumption as to sameness in phase of the two currents flowing in the output circuits of the transformers 4 and 5, is not likely to be realized. This is due to the fact that the distance from oscillator 1 to pickup 3 is substantially greater than the distance from oscillator 1 to pickup 2 so that, because of its limited speed of travel, a wave generated at oscillator 1 will arrive at pickup 3 later than at pickup 2; and, likewise, the resultant delay in time of arrival at pickup 3 as compared with the time of arrival at pickup 2, causes a corresponding delay in phase of the electric currents induced in circuits 4, 6, 7 and 5, 9, 10.

Phase difference of this type between the said currents will cause a current flow in the indicator input circuit 12, 14, 9, 6, 8, and will correspondingly deflect the needle of indicating meter 13. However, such deflection can be reduced to zero by an appropriate adjustment of the sliders on potentiometers 8 and 6.

If it be assumed in this connection, for purposes of illustration, that the resistance values of potentiometer 8 and resistor 11 are high as compared with the reactances of condensers 7 and 10, then the phase difference between the output currents of transformers 4 and 5, and consequently the delay in the time of arrival of the mechanical waves at pickup 3 as compared with the time of arrival at pickup 2, is proportionate to the value of the resistance between the center point of potentiometer 8 and the final position to which its slider has been moved in eliminating the deflection of meter needle 13 last mentioned.

Under certain circumstances that may be encountered, the performance of the apparatus may be improved by tuning the two circuits 4, 6, 7 and 5, 9, 10 to the frequency of the mechanical waves artificially created at oscillator 1, by the introduction of two similar condensers in series with the said circuits. By proceeding in this way, it is possible to reduce the effect of other mechanical vibrations not related to the waves set up by oscillator 1. Such condensers, suitably located, are denoted by the reference numerals 14, 15.

In using the above described apparatus according to my invention, the mechanical wave pattern created by oscillator 1 is investigated in the manner above described by measuring the amplitude ratio and the phase difference between pickups 2 and 3, the determination being made by reading the potentiometers. Pickup 2 is then preferably moved to the location of pickup 3, and the latter is moved to a new location approximately the same distance from its previous location as the original space between pickups 2 and 3, and preferably in the same line. In this new location of the pickups, their amplitude ratio and phase difference are again determined in the same way as before. The pickups may then be moved to other points and the same investigation repeated.

By systematically proceeding in this manner the investigations may be carried out along predetermined lines or profiles which, in turn, can be plotted or charted to reflect the thus measured amplitude ratios and phase differences. By combining the plots of several systematically distributed profiles or lines, preferably arranged in radiating or parallel directions, patterns showing the distribution of equiamplitude and equiphase values may readily be constructed.

As previously mentioned, the form or arrangement of these patterns is based upon the speed of propagation or travel of the mechanical waves within the various media traversed by them. It is well known that the resultant arrangement of these patterns is particularly affected by the reflection and refraction phenomena, which generally take place whenever the speed of travel or propagation changes because of differences in two media. Consideration of these phenomena, therefore, is important when interpreting the results of investigations carried out as above described.

It will be understood that various changes may be resorted to in the form, construction, arrangement and material of the several parts constituting the apparatus hereinabove described, and in the steps followed in carrying out the method, without departing from the spirit and scope of my invention; hence I do not intend to be limited to the details herein set forth except as they may be included in the claims.

What I claim is:

1. Apparatus of the character described comprising, two pickups adapted to change continuous mechanical vibrations into continuous electrical oscillations, a plurality of similar electrical resistances in circuit with said pickups, similar phase shifting devices electrically connected to one said resistance in each circuit, and a direct reading and balance indicating device electrically connected to the said circuits for measuring the amplitude and phase relation of the artificially produced mechanical vibrations without the employment of a recording device involving manual procedure for obtaining its indication.

2. Apparatus of the character described comprising, two pickups adapted to change continuous mechanical vibrations into continuous electrical oscillations, a plurality of similar electrical resistances in circuit with said pickups, similar condensers electrically connected so as to shunt one said resistance in each circuit, and a direct reading and balance indicating device electrically connected to the said circuits for measuring the amplitude and phase relation of the artificially produced mechanical vibrations without the employment of a recording device involving manual procedure for obtaining its indication.

3. Apparatus of the character described comprising, two pickups adapted to change continuous mechanical vibrations into continuous electrical oscillations, a plurality of similar electrical resistances in circuit with said pickups, similar phase shifting devices electrically connected to one said resistance in each circuit, and a direct reading and balance indicating device electrically connected in series to the said circuits for measuring the amplitude and phase relation of the artificially produced mechanical vibrations without the employment of a recording device involving manual procedure for obtaining its indication.

4. Apparatus of the character described comprising, two pickups adapted to change continuous mechanical vibrations into continuous electrical oscillations, a plurality of similar electrical resistances in circuit with said pickups, similar condensers electrically connected so as to shunt one said resistance in each circuit, and a direct reading and balance indicating device electrically connected in series to the said circuits for measuring the amplitude and phase relation of the artificially produced mechanical vibrations without the employment of a recording device involving manual procedure for obtaining its indication.

5. Apparatus of the character described comprising, two pickups adapted to change continuous mechanical vibrations into continuous electrical oscillations, a plurality of similar electrical resistances, including resistances of the potentiometer type, in circuit with said pickups, similar phase shifting devices electrically connected to one said resistance in each circuit, and a direct reading and balance indicating device electrically connected to the said circuits for measuring the amplitude and phase relation of the artificially produced mechanical vibrations without the employment of a recording device involving manual procedure for obtaining its indication.

6. Apparatus of the character described comprising, two pickups adapted to change continuous mechanical vibrations into continuous electrical oscillations, a plurality of similar electrical resistances, including resistances of the potentiometer type, in circuit with said pickups, similar condensers electrically connected so as to shunt one said resistance in each circuit, and a direct reading and balance indicating device electrically connected to the said circuits for measuring the amplitude and phase relation of the artificially produced mechanical vibrations without the employment of a recording device involving manual procedure for obtaining its indication.

7. Apparatus of the character described comprising, two pickups adapted to change continuous mechanical vibrations into continuous electrical oscillations, a plurality of similar electrical resistances, including resistances of the potentiometer type, in circuit with said pickups, similar phase shifting devices electrically connected to one said resistance in each circuit, and a direct reading and balance indicating device electrically connected in series to the said circuits for measuring the amplitude and phase relation of the artificially produced mechanical vibrations without the employment of a recording device involving manual procedure for obtaining its indication.

8. Apparatus of the character described comprising, two pickups adapted to change continuous mechanical vibrations into continuous electrical oscillations, a plurality of similar electrical resistances, including resistances of the potentiometer type, in circuit with said pickups, similar condensers electrically connected so as to shunt one said resistance in each circuit, and a direct reading and balance indicating device electrically connected in series to the said circuits for measuring the amplitude and phase relation of the artificially produced mechanical vibrations without the employment of a recording device involving manual procedure for obtaining its indication.

THEODOR ZUSCHLAG.